United States Patent [19]

Hundseder et al.

[11] Patent Number: 4,948,291
[45] Date of Patent: Aug. 14, 1990

[54] CONNECTING PANEL FOR MECHANICALLY JOINING A NUMBER OF COMMUNICATION COMPONENTS ARRANGED SIDE-BY-SIDE

[75] Inventors: Max Hundseder, Puchheim; Peter Otto, Munich, both of Fed. Rep. of Germany

[73] Assignee: Siemens Aktiengesellschaft, Berlin and Munich, Fed. Rep. of Germany

[21] Appl. No.: 241,866

[22] Filed: Sep. 8, 1988

[30] Foreign Application Priority Data

Sep. 9, 1987 [DE] Fed. Rep. of Germany ....... 8712232

[51] Int. Cl.$^5$ .............................................. B25G 3/00
[52] U.S. Cl. ................................... 403/301; 403/406.1
[58] Field of Search ............. 403/301, 300, 292, 406.1

[56] References Cited

U.S. PATENT DOCUMENTS 4,335,973 6/1982 Beck et al. ......................... 403/300
4,498,802 2/1985 Tufo et al. .......................... 403/300
4,544,301 10/1985 Lake, Jr. et al. .................... 403/300

Primary Examiner—Andrew V. Kundrat
Attorney, Agent, or Firm—Hill, Van Santen Steadman & Simpson

[57] ABSTRACT

A connecting panel for joining communication components, the connecting panel having projections introduceable into pocket-shaped receptacles in the base of the communication components and being held in guides at the base. The connecting panel is designed essentially Y-shaped and has projections spacially offset relative to one another. These projections are at two arms that proceed parallel to one another and are joined to one another by a centrally located arm. A further arm proceeding perpendicularly relative to the centrally located arm has a projection proceeding in its longitudinal axis. The guides provided at the base are in the form of ribs having a T-shaped cross section.

2 Claims, 1 Drawing Sheet

CONNECTING PANEL FOR MECHANICALLY JOINING A NUMBER OF COMMUNICATION COMPONENTS ARRANGED SIDE-BY-SIDE

BACKGROUND OF THE INVENTION

1. Field of the Invention

The present invention is directed to a connecting panel for mechanically joining a plurality of communication components, particularly telephone equipment, arranged side-by-side, and in particular to such connecting panels wherein the connecting panel is insertable with projections thereof into pocket-shaped receptacles in the base of the equipment and is held in guides at the base, whereby wedge-shaped catch noses are provided at the base, these engaging in a latching fashion into recesses in the connecting panel in the joined condition of the components.

2. Description of the Related Art

A connecting panel for mechanically joining a plurality of communication components arranged side-by-side is known. Such connecting panels are known as carrying rails wherein hooks are arranged and engaged into pockets of the base, whereby a printed circuit board is embedded in the respective carrying rail. This printed circuit board produces the electrical and mechanical joining of the apparatus in a coupling via contact paths and contact elements situated in the components. However, such rails have the disadvantage of requiring a relatively complex structure. Therefore, the rails cannot be manufactured economically.

Connecting panels which have their long side introducible into guide channels formed by webs and laterally arranged in the respective receptacles are also known. The connecting panel is provided with recesses that enter into a latched connection with noses arranged in the respective receptacle. Tabs lying in the aligning line with these recesses in their edge regions are bent out. These tabs point away from their base in the inserted condition.

SUMMARY OF THE INVENTION

It is the object of the present invention to provide further connection between communication components that, additionally reduces the cost of manufacturing the connecting panel.

This above object is achieved in accordance with the principles of the present invention in a connecting panel wherein the connecting panel is designed essentially Y-shaped. The connecting panel has projections spatially offset relative to one another at two arms proceeding parallel to one another and joined to one another by a centrally located arm. A further arm proceeds perpendicular to the centrally located arm. This arm which is perpendicular to the centrally located arm has a projection proceeding in its longitudinal access, whereby the guides arranged at the base and designed as guide ribs each have a T-shaped cross section.

Since only a single connecting panel which can be introduced in latching fashion into the uniformly fashioned floor walls of the individual components is now required for joining the communications equipment to one another, the manufacturing cost for the connecting panels that are otherwise usually present in many shapes can be significantly reduced. The guidance required upon insertion of the connecting panel in this case ensues, first, by the guides having a T-shaped cross section that is situated in an aligning line and is arranged in the base. The final joining of the components to one another ensues by wedge-shaped catch noses provided at the base that engage into recesses in the connecting panel. Preferably, these catch noses are provided at the base such that, as seen in the plug-in direction, they are arranged opposed to one another.

DESCRIPTION OF THE PREFERRED EMBODIMENTS

Figure 3:
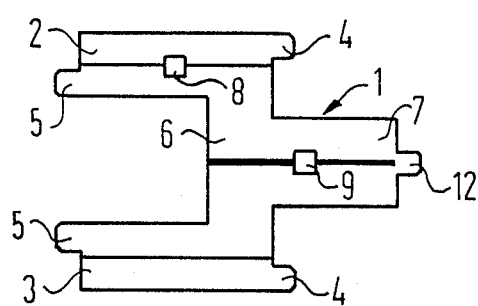
FIG. 3 is a plan view of the connecting panel.

As shown in FIG. 3, the connecting panel 1 which joins the communication components is designed essentially Y-shaped. As may be seen from FIG. 3, the connecting panel has projections 4 and 5 spatially offset relative to one another. These projections 4 and 5 are at the two arms 2 and 3 of the connecting panel 1 that proceed parallel to one another. The two arms 2 and 3 are connected to one another via the centrally located arm 6. The arm 7 proceeds perpendicularly and centrally relative to this centrally located arm 6. The arm 7 likewise has a projection 12 in its longitudinal axis and situated at its free end. Further, the connecting panel 1 has recesses 8 and 9, having a square cross section, in its arms 2 and 7.

Figure 1:
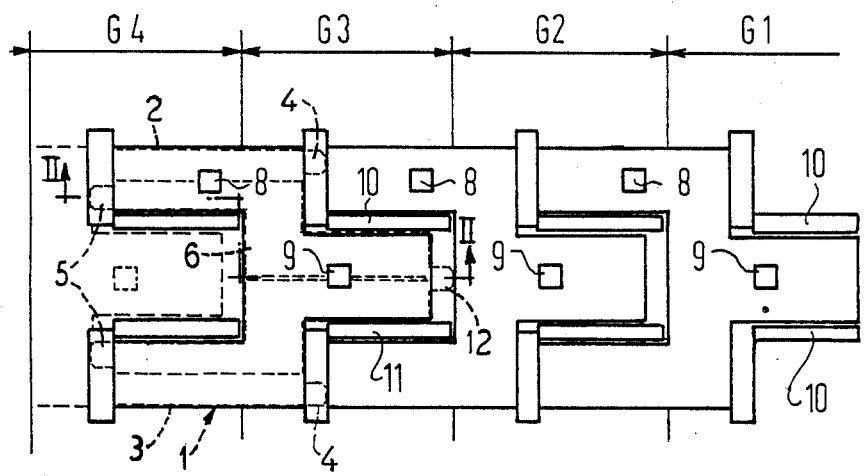
FIG. 1 is a plan view of a plurality of communication components joined by connecting panels.

As seen in FIG. 1, communication components are joined mechanically to one another on the basis of a uniformly designed connecting panel 1. For the purpose of joining the communication components, each component G1, G2, G3 and G4 has guide ribs 10 and 11 which have a T-shaped cross section in the region of their bases 17. These guide ribs 10 and 11 proceed in alignment with one another and form receptacles for the edge regions of the arms 2 and 3 pointing toward one another, and, form receptacles for the two edge regions of the arm 7.

Figure 2:
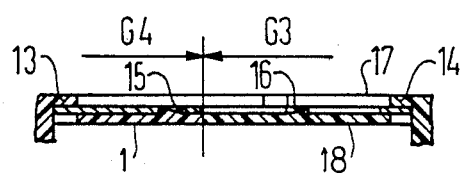
FIG. 2 is a partial cross section of two communication components joined to one another.

As shown in FIG. 2, the respective projections 4, 5 and 12, of the arms 2, 3 and 7, engage respective pocket-shaped receptacles formed by outer flanges 13 and 14 and in a central region 18 in the base 17 of the individual components when the communication components are joined to one another. Oppositely directed catch noses 15 and 16 are arranged at the respective base 17 of the individual components. These catch noses 15 and 16 engage in latching fashion into the recesses 8 and 9, thus preventing separation of the individual components G1, G2, G3 and G4.

As is apparent from the foregoing specification, the invention is susceptible to being embodied with various alterations and modifications which may differ particularly from those that have been described in the preceding specification and description. It should be understood that we wish to embody within the scope of the patent warranted hereon all such modificatons as reasonably and properly come with the scope of our contribution to the art.

We claim as our invention:

1. An assembly for mechanically joining a plurality of components in a series of side-by-side pairs of components, said assembly comprising for each pair of components:

a connecting plate having two spaced lateral sections and a center section all connected to a middle section with said lateral sections extending from said middle section in a direction opposite said center section;

said center section having an opening therein and one of said lateral sections having an opening therein;

each of said lateral sections having an exposed end having a tab, said center section having an exposed end having a tab and said middle section having two spaced exposed edges each having a tab;

guide rails and pockets disposed on a base of each of said components at positions to receive each connecting plate with the tabs disposed in said pockets and the center section of each plate disposed between said guide rails and between the lateral sections of an adjacent plate; and two catch noses projecting from said base of each component positioned so that one catch nose on one component in each pair of side-by-side components is received in said opening in said center section of said connector plate and one catch nose one the other component in each pair of side-by-side components is received in said opening in said one lateral section of said connector plate so that each side of each component in each pair of side-by-side components is held against a side of the other component in the pair.

2. An assembly as claimed in claim 1, wherein said tabs are received in said pockets by moving said connecting plate in an insertion direction, and wherein said two catch noses are wedge-shaped to permit movement of said connecting plate in said insertion direction and to oppose movement of said connecting plate, when said tabs are received in said pockets, in a direction opposite to said insertion direction.

* * * * *